United States Patent
Yarbrough et al.

(10) Patent No.: US 10,533,534 B2
(45) Date of Patent: Jan. 14, 2020

(54) COMPOSITE LAYERS FOR BONDING COMPONENTS OF A WIND TURBINE ROTOR BLADE

(71) Applicant: General Electric Company, Schenectady, NY (US)

(72) Inventors: Aaron A. Yarbrough, Greenville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 1162 days.

(21) Appl. No.: 14/848,658

(22) Filed: Sep. 9, 2015

(65) Prior Publication Data

US 2017/0067439 A1    Mar. 9, 2017

(51) Int. Cl.
*F03D 1/06* (2006.01)
*B29C 65/00* (2006.01)
(Continued)

(52) U.S. Cl.
CPC .......... *F03D 1/0675* (2013.01); *B29C 65/488* (2013.01); *B29C 66/721* (2013.01); *B29L 2031/085* (2013.01)

(58) Field of Classification Search
CPC . B29C 65/02; B29C 65/4815; B29C 65/4835; B29C 65/488; B29C 65/5014; B29C 65/5021; B29C 65/5028; B29C 65/5035; B29C 65/5057; B29C 66/112; B29C 66/1122; B29C 66/131;
(Continued)

(56) References Cited

U.S. PATENT DOCUMENTS 6,264,877 B1    7/2001  Pallu De La Barriere
8,317,479 B2   11/2012  Vronsky et al.
(Continued)

FOREIGN PATENT DOCUMENTS

CN    101906251     8/2010
JP    2007-92716    4/2007
(Continued)

OTHER PUBLICATIONS

Teuwen et al., Vacuum Infused Thermoplastic Composites for Wind Turbine Blades, 2008 Wind Turbine Blade Workshop—Sandia National Laboratories, Jun. 3, 2008, 22 pages.
(Continued)

*Primary Examiner* — Mark A Laurenzi
*Assistant Examiner* — Paul W Thiede
(74) *Attorney, Agent, or Firm* — Dority & Manning, P.A.

(57) ABSTRACT

The present disclosure is directed to a method for bonding composite blade components of a rotor blade of a wind turbine. The method includes providing a first blade component being constructed of a first composite material. The method also includes providing a second blade component being constructed of a second composite material. Further, the method includes arranging the first and second blade components together at an interface. Another step includes placing one or more layers of a wetted composite material between the first and second blade components at the interface. The method also includes allowing the one or more layers of the wetted composite material at the interface to cure.

11 Claims, 9 Drawing Sheets

(51) Int. Cl.
*B29C 65/48* (2006.01)
*B29L 31/08* (2006.01)

(58) Field of Classification Search
CPC ..... B29C 66/532; B29C 66/54; B29C 66/721; B29L 2031/085; F03D 1/0675; Y02E 10/721; Y02P 70/523
USPC .......................................... 416/1, 226, 229 R
See application file for complete search history.

(56) References Cited

U.S. PATENT DOCUMENTS

| | | | |
|---|---|---|---|
| 8,657,581 B2 | 2/2014 | Pilpel et al. | |
| 8,673,106 B1 | 3/2014 | Jolley et al. | |
| 8,747,098 B1 | 6/2014 | Johnson et al. | |
| 8,961,142 B2 | 2/2015 | Wansink | |
| 8,992,813 B2 | 3/2015 | Robbins et al. | |
| 2008/0219851 A1* | 9/2008 | Althoff | F03D 1/0675 416/226 |
| 2009/0148300 A1 | 6/2009 | Driver et al. | |
| 2011/0097211 A1 | 4/2011 | Rudling | |
| 2012/0082547 A1* | 4/2012 | Baker | F03D 1/0675 416/1 |
| 2013/0164133 A1 | 6/2013 | Grove-Nielsen | |
| 2014/0295187 A1 | 10/2014 | Jacobsen et al. | |
| 2014/0301859 A1* | 10/2014 | Hancock | F03D 1/0675 416/230 |
| 2014/0316063 A1* | 10/2014 | Hochstetter | B29C 70/52 524/607 |

FOREIGN PATENT DOCUMENTS

| | | |
|---|---|---|
| WO | WO 2010/025830 A2 | 3/2010 |
| WO | WO 2011/088835 A2 | 7/2011 |
| WO | WO 2011/098785 A2 | 8/2011 |
| WO | WO 2015/015202 A1 | 2/2015 |

OTHER PUBLICATIONS

U.S. Appl. No. 14/835,967, filed Aug. 26, 2015.

* cited by examiner

COMPOSITE LAYERS FOR BONDING COMPONENTS OF A WIND TURBINE ROTOR BLADE

FIELD OF THE INVENTION

The present invention relates generally to the field of wind turbines, and more particularly to composite layers for bonding blade components of a rotor blade of a wind turbine that replace conventional adhesives.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades are the primary elements for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

Figure 4:
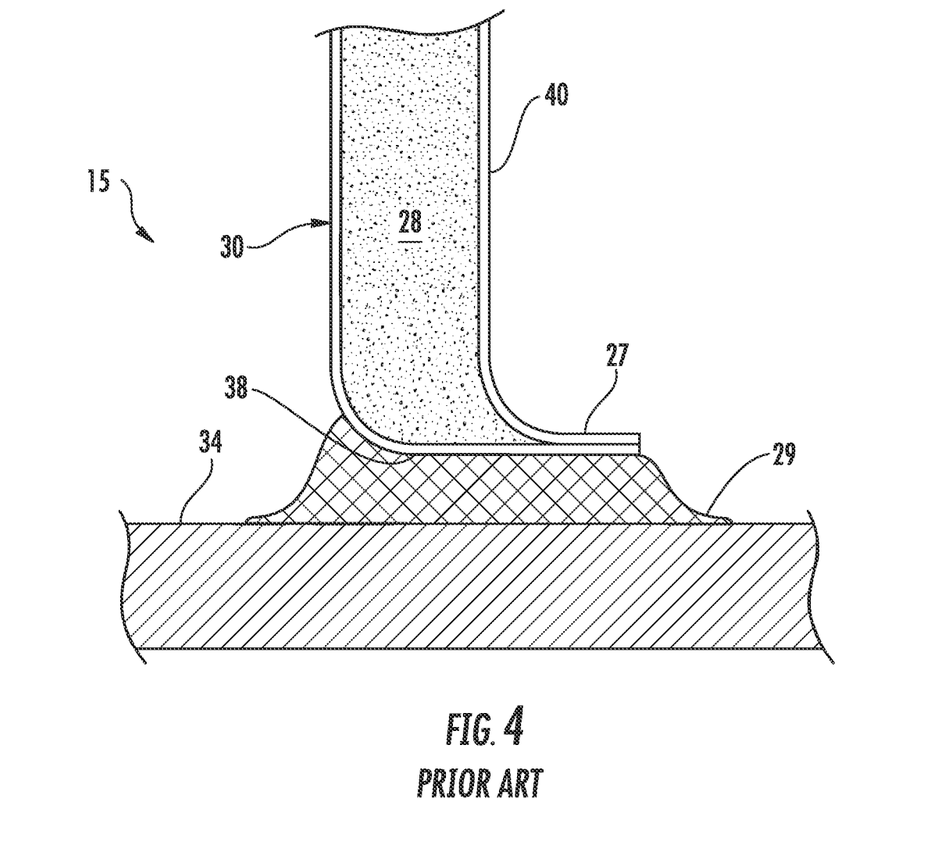
FIG. 4 illustrates a detailed, cross-sectional view of a bonded interface between the shear web and spar cap of FIG. 3 according to conventional construction.

The rotor blades typically consist of a suction side shell and a pressure side shell that are bonded together at bond lines along the leading and trailing edges of the blade. An internal shear web extends between the pressure and suction side shell members and is bonded to spar caps affixed to the inner faces of the shell members. With typical blade configurations, the shear web is a continuous member that spans between the spar caps. More specifically, as shown in FIG. 4, an interface 15 of a shear web 30 and a spar cap 34 of conventional construction is illustrated. As shown, the shear web 30 is typically constructed of a core material 28 laminated together with a rigid flange 27 to achieve a desired bond width for bond paste 29 applied between the spar caps 32, 24 and transverse ends 36, 38 of the shear web 30. This configuration, however, places significant stresses at the juncture 15 between the shear web 30 and spar cap 32, 34 and often results in the use of excess bond paste 29 to achieve a desired bond width at this critical juncture 15. The excess paste contributes unnecessary weight to the blade and can break off, thereby resulting in blade "rattling" during operation of the wind turbine (a common complaint from wind turbine owners and/or operators). Also, air voids and unpredictable squeeze-out of the bond paste in the typical configurations can result in areas of decreased bond strength, which is particularly problematic in sections of the blade where repair is not possible from within the rotor blade. In addition, conventional bond paste can be expensive.

Accordingly, the industry would benefit from an improved bonding configuration between composite components of the rotor blade that addresses one or more of the aforementioned deficiencies.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for bonding composite blade components of a rotor blade of a wind turbine. The method includes providing a first blade component being constructed of a first composite material. The method also includes providing a second blade component being constructed of a second composite material. Further, the method includes arranging the first and second blade components adjacent to each other. Another step includes placing one or more layers of a wetted composite material between the first and second blade components at an interface therebetween. The method also includes allowing the one or more layers of the wetted composite material at the interface to cure.

In one embodiment, the step of placing one or more layers of the wetted composite material between the first and second blade components at the interface may further include drawing a fiber material through a bath of resin material, placing the wetted fiber material at the interface, and curing the fiber material between the first and second blade components. In certain embodiments, the step of placing the wetted fiber material at the interface may include unrolling (e.g. manually or automatically) the wetted fiber material at the interface. In additional embodiments, the method may also include layering the fiber material at the interface.

In particular embodiments, the fiber material may include at least one of glass fibers, carbon fibers, metal fibers, polymer fibers, ceramic fibers, nanofibers, or combinations thereof. In further embodiments, the resin material may include a thermoset material, a thermoplastic material, or similar, or combinations thereof.

In another embodiment, the first and second composite materials may include prefabricated composite materials. For example, in certain embodiments, the prefabricated composite materials may include one or more cured resin materials reinforced with at least one fiber material. More specifically, the first blade component may include a shear web of the rotor blade, whereas the second blade component may include a spar cap of the rotor blade. In an alternative embodiment, the first blade component may include a spar cap of the rotor blade, whereas the second blade component may include a blade shell of the rotor blade. In yet another embodiment, the first blade component may include a pressure side of the rotor blade and the second blade component may include a suction side of the rotor blade.

In another aspect, the present disclosure is directed to a method for bonding a shear web between opposing spar caps of a rotor blade of a wind turbine. Further, the shear web has a first end and a second end. The method includes arranging the shear web between the opposing spar caps, wherein the first end of the shear web contacts an upper spar cap at a first interface and the second end of the shear web contacts a lower spar cap at a second interface. In addition, the method includes placing one or more layers of a wetted composite material at the first and second interfaces. Further, the method includes allowing the one or more layers of the wetted composite material at the first and second interfaces to cure.

In one embodiment, as mentioned, the step of placing one or more layers of the wetted composite material at the first and second interfaces may include drawing a fiber material through a bath of resin material, placing the wetted fiber material at the interface, and curing the fiber material at the first and second interfaces. In another embodiment, the step of placing the wetted fiber material at the interface may include unrolling (e.g. manually or automatically) the wetted fiber material at the interface. Thus, in certain embodiments, the wetted fiber material may include a roll of continuous fiber material that can be easily unrolled and applied at the interface. It should also be understood that the method may include any of the additional features and/or steps as described herein.

In yet another aspect, the present disclosure is directed to a rotor blade assembly for a wind turbine. The rotor blade assembly includes a shell member having at least one spar cap configured on an internal surface thereof. Further, the spar cap is constructed of a composite material. The rotor blade assembly also includes a shear web secured to the spar cap at a bonded interface. Further, the shear web is constructed of a composite material. In addition, the bonded interface includes one or more layers of a cured composite material. More specifically, the composite material includes cured resin material reinforced with one or more fiber materials.

In one embodiment, the shell member may include an upper shell member and a lower shell member. The upper shell member has at least one upper spar cap configured on an internal surface thereof, whereas the lower shell member has at least one lower spar cap configured on an internal surface thereof.

In another embodiment, the bonded interface may have a plurality of layers of composite material. Further, the resin material may include a thermoset material, a thermoplastic material, or similar, or combinations thereof. In additional embodiments, the fiber material may include at least one of glass fibers, carbon fibers, metal fibers, polymer fibers, ceramic fibers, nanofibers, or combinations thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

Generally, the present disclosure is directed a method for bonding composite blade components of a rotor blade of a wind turbine. For example, the method includes arranging two or more composite blade components together at an interface. Another step includes placing one or more layers of a wetted composite material between the first and second blade composite components at the interface and allowing the one or more layers of the wetted composite material at the interface to cure. Thus, the method of the present disclosure replaces conventional bond paste with hand-lay up (HLU) resin layers reinforced with one or more fiber materials. Further, in certain embodiments, the HLU bonded interface can be constructed by drawing the fabric glass through a resin bath in order to wet the fabric sufficiently. The wetted fabric can then be spread, e.g. via hand, by unrolling the fabric onto the desired bond area. Thus, in certain embodiments, the wetted fiber material may include a roll of continuous fiber material that can be easily unrolled and applied at the interface. The HLU can then cure and form an effective bond between the two prefabricated composite components.

The present subject matter provides numerous advantages not present in the prior art. For example, the present disclosure provides a lower cost bonding solution than conventional bond paste. Further, the method of the present disclosure provides compatibility with current resin system and manufacturing processes. In addition, the method of the present disclosure provides the ability to laminate various thicknesses and to tailor fit blade components. Thus, the method described herein provides a reinforced bonding component to join the rotor blade at multiple locations, including but not limited to the shear webs, leading and trailing edges, and spar caps.

Figure 1:
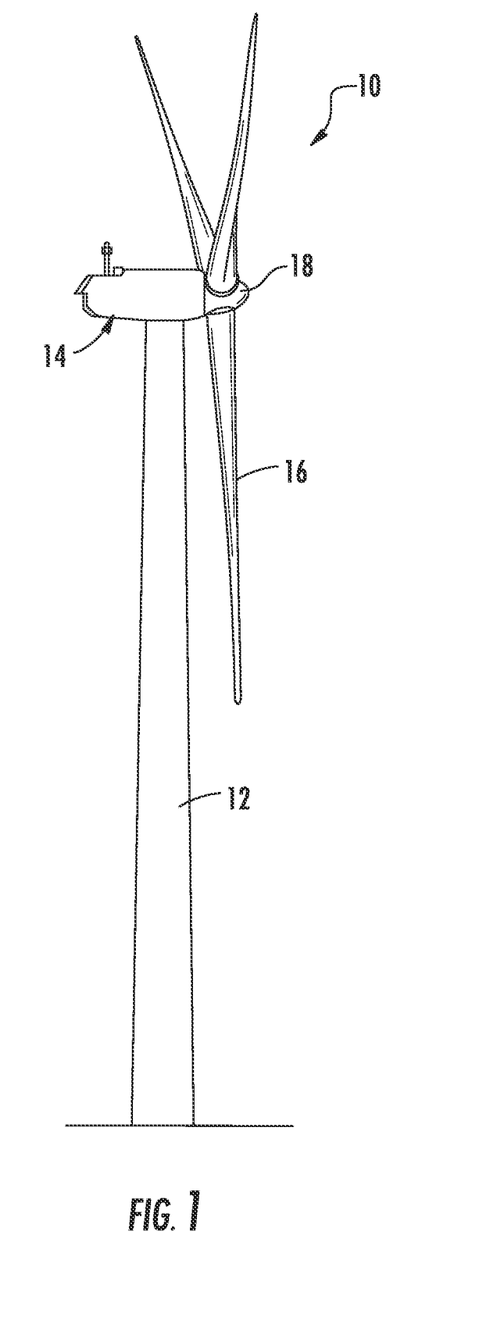
FIG. 1 illustrates a perspective view of one embodiment of a wind turbine according to the present disclosure.

Referring now to the drawings, FIG. 1 illustrates one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
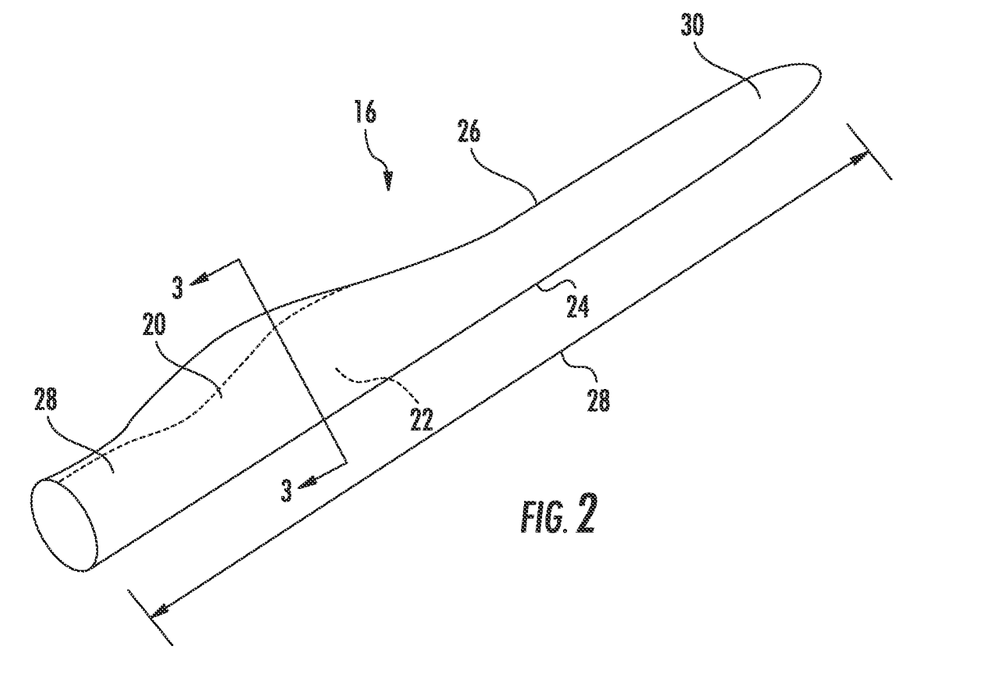
FIG. 2 illustrates a perspective view of one embodiment of a rotor blade of a wind turbine according to the present disclosure.
Figure 3:
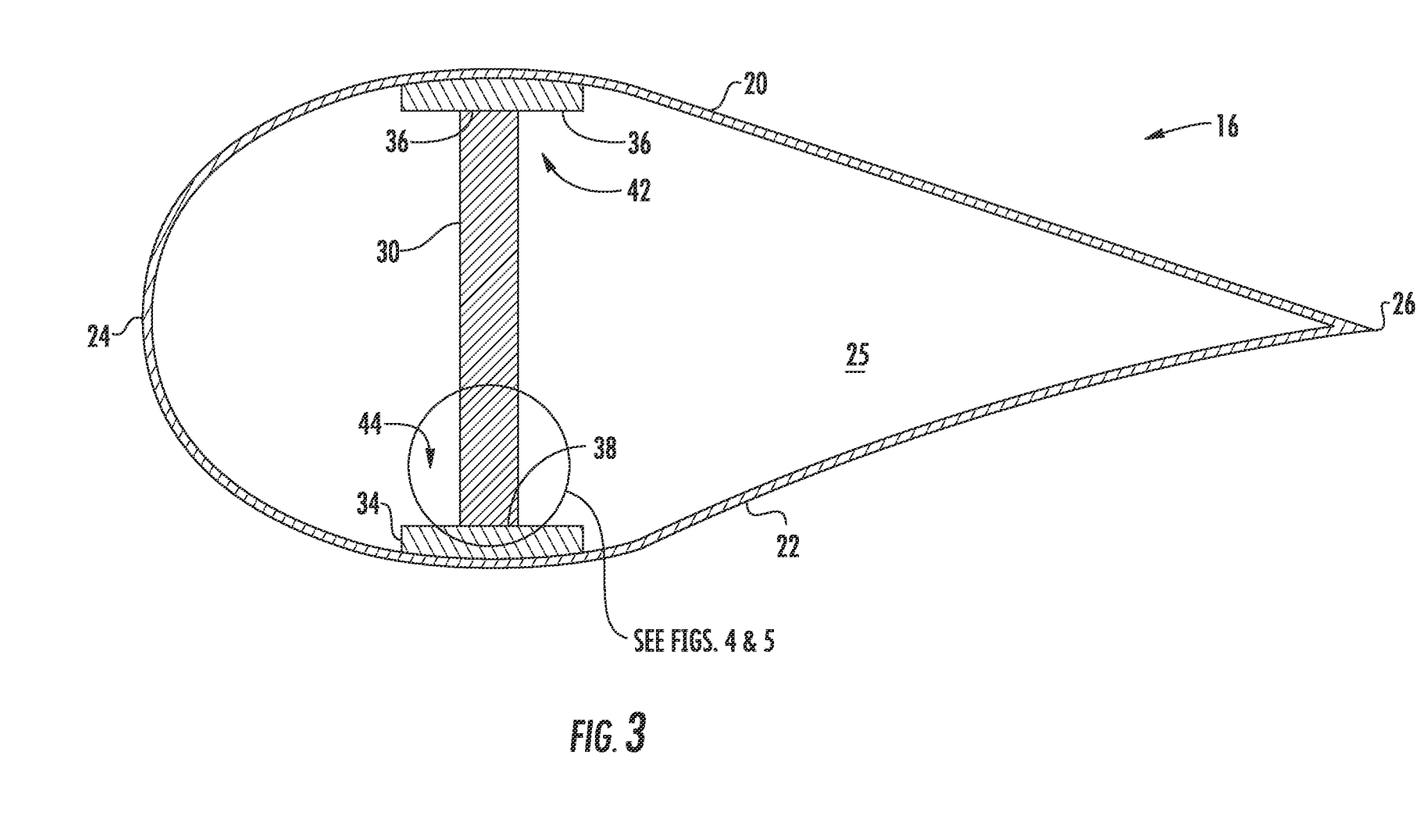
FIG. 3 illustrates a cross-sectional view of the rotor blade of FIG. 2 along line 3-3.

Referring now to FIG. 2, a more detailed view of one of the rotor blades 16 of FIG. 1 is illustrated. As shown, the rotor blade 16 includes an upper shell member 20 (e.g. a suction side) and a lower shell member 22 (e.g. a pressure side). Further, the upper shell member 20 is configured as the suction side surface of the blade 16, while the lower shell member 22 is configured as the pressure side surface of the blade 16. The rotor blade 16 also includes a leading edge 24 and a trailing edge 26, as well as a root portion 28 and a tip portion 30. As is well known in the art, the upper shell member 20 and the lower shell member 22 may be joined together at the leading edge 24 and trailing edge 26 or any other suitable location. The rotor blade 16 also includes an internal cavity 25 (FIG. 3) in which various structural members, such as spar caps 32, 34 and one or more shear webs 30 according to the present disclosure, may be configured It should also be understood that the rotor blade 16 of FIG. 2 is provided for illustrative purposes only. For example, in additional embodiments, the rotor blade may be a modular rotor blade such as described in U.S. application Ser. No. 14/753,137 entitled "Modular Wind Turbine Rotor Blades and Methods of Assembling Same" filed on Jun. 29, 2015 and which is incorporated herein by reference in its entirety.

Referring now to FIGS. 3 and 5-8, various views of the rotor blade 16 of FIG. 2 are illustrated that incorporate various aspects of the present invention. As shown generally in the figures, the upper shell member 20 contains an upper spar cap 32 configured on an internal surface thereof. Similarly, the lower shell member 22 contains a lower spar cap 34 configured on an internal surface thereof. The shear web 30 extends between the spar caps 32, 34 along a longitudinal length of the blade 16 in a generally span-wise direction. Further, as shown generally in the figures, the shear web 30 has a first end 36 and a second end 38. More particularly, the shear web 30 may be constructed of a panel 35 having of a core material 28 enclosed, at least in part, by an outer skin layer 40. It should be understood that the core material 28 may include any suitable core material, including but not limited to, low-density foam, cork, composites, balsa wood, composites, or similar. Suitable low-density foam materials may include, but are not limited to, polystyrene foams (e.g., expanded polystyrene foams), polyurethane foams (e.g. polyurethane closed-cell foam), other foam rubbers/resin-based foams and various other open cell and closed cell foams.

Figure 7:
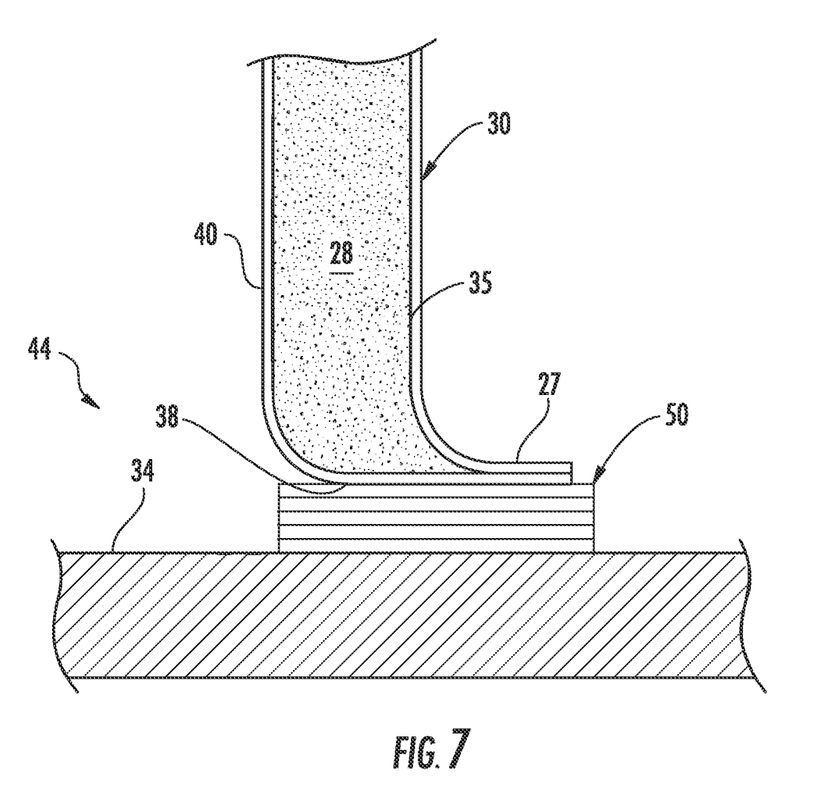
FIG. 7 illustrates a detailed, cross-sectional view of one embodiment of a bonded interface between the shear web and spar cap of FIG. 3 according to the present disclosure.

In addition, as shown, the first end 36 may be secured to the upper spar cap 32 at a first interface 42 and the second end 36 may be secured to the lower spar cap 34 at a second interface 44. More specifically, as shown in FIG. 7, the shear web 30 may be secured to the upper and lower spar caps 32, 34 at the first and second bonded interfaces 42, 44 via one or more composite materials 50 configured between the first and second ends 36, 38 of the shear web 30 and the upper and lower spar caps 32, 34, respectively. Thus, in certain embodiments, the bonded interfaces 42, 44 may include hand-lay up (HLU) resin layers reinforced with one or more fiber materials.

Figure 5:
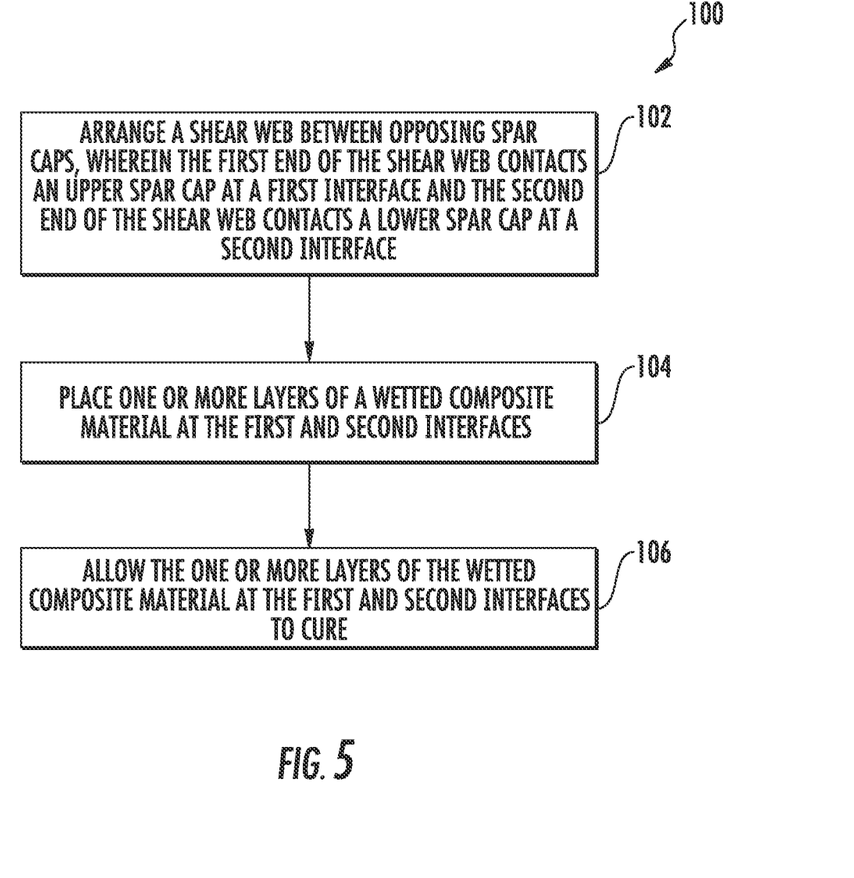
FIG. 5 illustrates a flow diagram of one embodiment of a method for bonding a shear web between opposing spar caps of a rotor blade of a wind turbine.

For example, as shown in FIGS. 5-9, various figures are illustrated to illustrate the bonding process for the shear web 30 between the spar caps 32, 34 according to one embodiment of the present disclosure. More specifically, as shown in FIG. 5, a flow diagram of a method 100 for bonding the shear web 30 between opposing spar caps 32, 34 of the rotor blade 16 of the wind turbine 10 is illustrated. As shown at 102, the method 100 includes arranging the shear web 30 between the opposing spar caps 32, 34 such that the first end 35 of the shear web 30 contacts the upper spar cap 32 at the first interface 42 and the second end 38 of the shear web 30 contacts the lower spar cap 34 at the second interface 44. In addition, as shown at 104, the method 100 includes placing one or more layers of a wetted composite material 50 at the first and second interfaces 42, 44. Further, as shown at 106, the method 100 includes allowing the one or more layers of the wetted composite material 50 at the first and second interfaces 42, 44 to cure.

Figure 6:
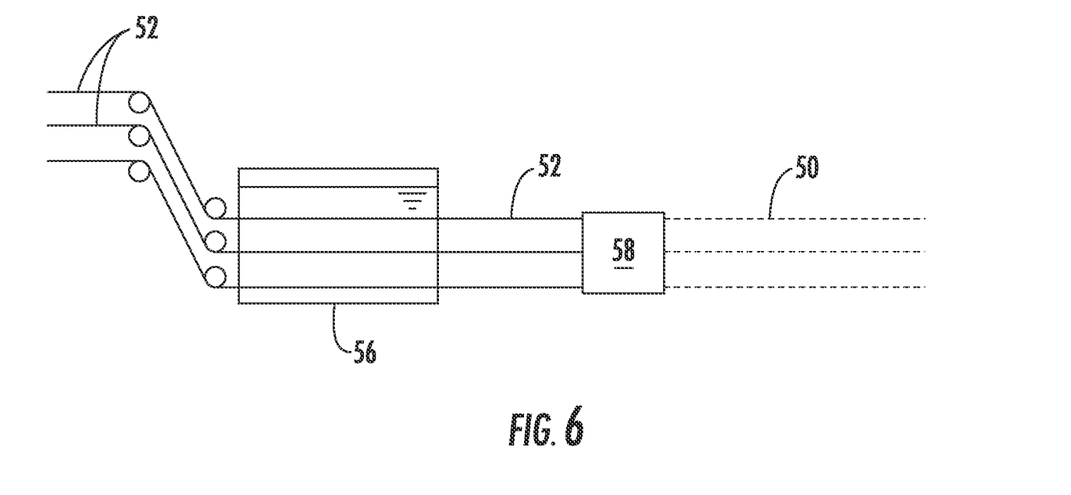
FIG. 6 illustrates a schematic diagram of one embodiment of a process for bonding composite blade components of a rotor blade of a wind turbine according to the present disclosure.

More specifically, as shown in FIG. 6, the step of placing one or more layers of the wetted composite material at the first and second interfaces 42, 44 may include drawing a fiber material 52 through a resin bath 56. More specifically, the fiber material may include at least one of glass fibers, carbon fibers, metal fibers, polymer fibers, ceramic fibers, nanofibers, or combinations thereof. In addition, the resin material in the resin bath 56 may include a thermoset material, a thermoplastic material, or similar, or combinations thereof. The thermoplastic materials as described herein generally encompass a plastic material or polymer that is reversible in nature. For example, thermoplastic materials typically become pliable or moldable when heated to a certain temperature and returns to a more rigid state upon cooling. Further, thermoplastic materials may include amorphous thermoplastic materials and/or semi-crystalline thermoplastic materials. For example, some amorphous thermoplastic materials may generally include, but are not limited to, styrenes, vinyls, cellulosics, polyesters, acrylics, polysulphones, and/or imides. More specifically, exemplary amorphous thermoplastic materials may include polystyrene, acrylonitrile butadiene styrene (ABS), polymethyl methacrylate (PMMA), glycolised polyethylene terephthalate (PET-G), polycarbonate, polyvinyl acetate, amorphous polyamide, polyvinyl chlorides (PVC), polyvinylidene chloride, polyurethane, or any other suitable amorphous thermoplastic material. In addition, exemplary semi-crystalline thermoplastic materials may generally include, but are not limited to polyolefins, polyamides, fluropolymer, ethylmethyl acrylate, polyesters, polycarbonates, and/or acetals. More specifically, exemplary semi-crystalline thermoplastic materials may include polybutylene terephthalate (PBT), polyethylene terephthalate (PET), polypropylene, polyphenyl sulfide, polyethylene, polyamide (nylon), polyetherketone, or any other suitable semi-crystalline thermoplastic material. Further, the thermoset materials as described herein generally encompass a plastic material or polymer that is non-reversible in nature. For example, thermoset materials, once cured, cannot be easily remolded or returned to a liquid state. As such, after initial forming, thermoset materials are generally resistant to heat, corrosion, and/or creep. Example thermoset materials may generally include, but are not limited to, some polyesters, some polyurethanes, esters, epoxies, or any other suitable thermoset material.

Still referring to FIG. 6, as shown, the wetted fiber material 52 may then be cut via a cutter 58 into strips or sheets of composite material 50. Thus, as shown in FIG. 7, the sheets or strips of composite material 50 may be easily placed into one or more layers at the interfaces 42, 44 between the shear web 30 and the spar caps 32, 34. Once placed, the method 100 may also include curing the wetted fiber material 52 at the interfaces 42, 44, e.g. by allowing the wetted material to dry.

Figure 8:
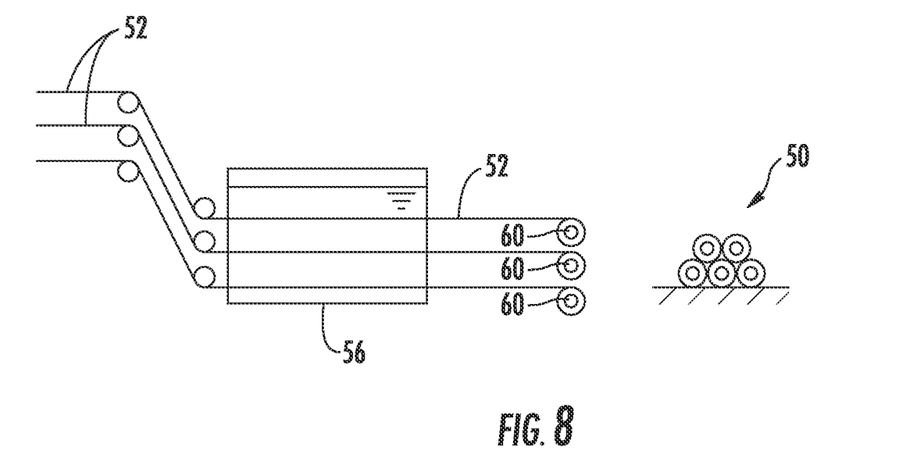
FIG. 8 illustrates a schematic diagram of another embodiment of a process for bonding composite blade components of a rotor blade of a wind turbine according to the present disclosure.

In another embodiment, the step of placing the wetted fiber material 52 at the interfaces 42, 44 may include unrolling, e.g. by hand or automatically, the wetted fiber material 52 at the interfaces 42, 44. For example, as shown in FIG. 8, the wetted fiber material 52 may be rolled into one or more rolls of composite material 50 after being drawn through the resin bath 56. Thus, the rolls of composite material 50 may be unrolled at one or more of the interfaces 42, 44 and allowed to cure. Thus, in certain embodiments, the wetted fiber material 52 may include a roll of continuous fiber material that can be easily unrolled and applied at the interface, e.g. along the span of the rotor blade 16. Accordingly, as shown, the bonded interfaces 42, 44, once cured, include one or more layers of a cured composite material 50.

Figure 9:
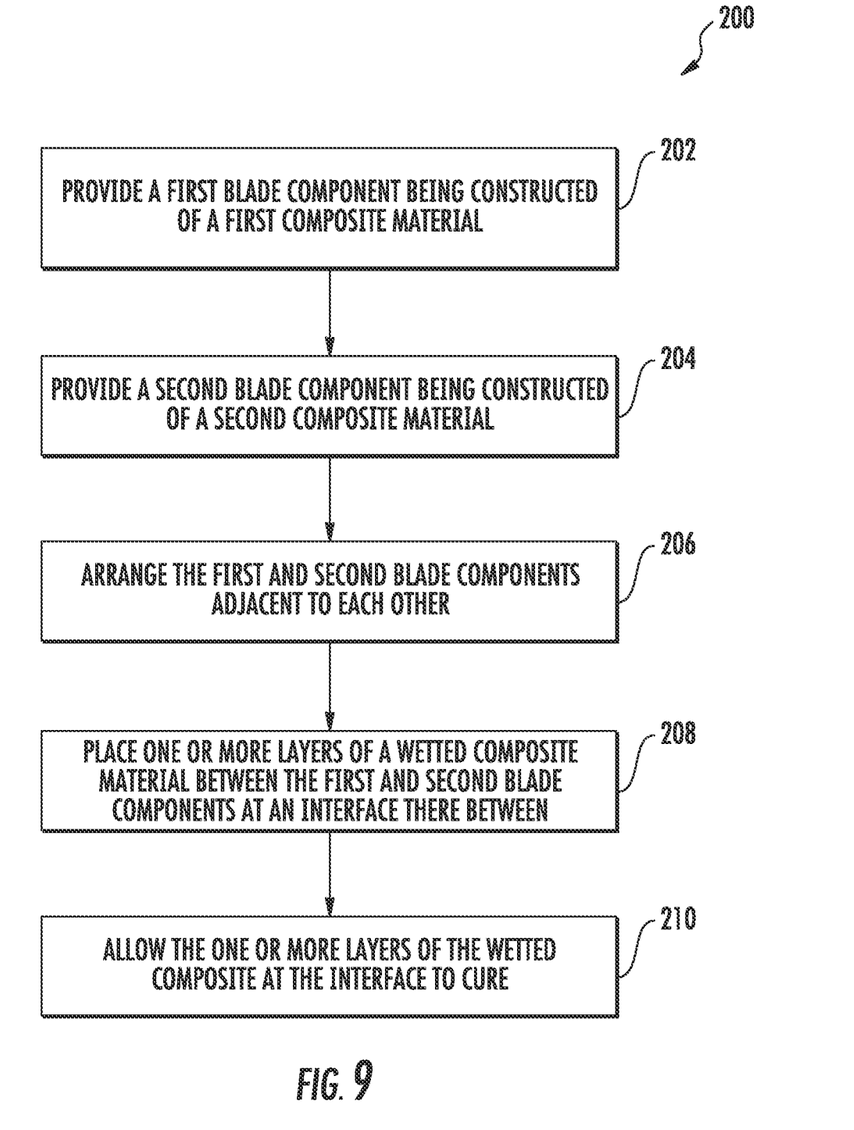
FIG. 9 illustrates a flow diagram of one embodiment of a method for bonding composite blade components of a rotor blade of a wind turbine according to the present disclosure.

Referring now to FIG. 9, a flow diagram of a method 200 for bonding composite blade components of the rotor blade 16 of the wind turbine 10 is illustrated. As shown at 202, the method 200 includes providing a first blade component being constructed of a first composite material. As shown at 204, the method 200 includes providing a second blade component being constructed of a second composite material. In certain embodiments, the first and second composite materials may include prefabricated composite materials. For example, as described herein, the prefabricated composite materials may include one or more cured resin materials reinforced with at least one fiber material. More specifically, as mentioned, the first blade component may include a shear web 30 of the rotor blade 16, whereas the second blade component may include a spar cap 32, 34 of the rotor blade 16. In an alternative embodiment, the first blade component may include a spar cap 32, 34 of the rotor blade 16, whereas the second blade component may include a blade shell 20, 22 of the rotor blade 16. In yet another embodiment, the first blade component may include a pressure side 22 of the rotor blade 16 and the second blade component may include a suction side 20 of the rotor blade 16. In additional embodiments, the blade components may also include ancillary components, including but not limited to balance boxes, root close-out, and/or aerodynamic add-on features. Thus, it should also be understood that the method as described herein may encompass bonding any composite materials of the rotor blade 16 together and are not limited to the components as specifically explained herein.

Thus, as shown at 206, the method 200 includes arranging the first and second blade components together at an interface. As shown at 208, the method 200 includes placing one or more layers of a wetted composite material between the first and second blade components at the interface. As shown at 210, the method 200 also includes allowing the one or more layers of the wetted composite material at the interface to cure.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for bonding composite blade components of a rotor blade of a wind turbine, the method comprising:
   providing a resin bath that contains a resin that includes one of a thermoset or thermoplastic material;
   forming a wetted fiber material by drawing a fiber material through the resin bath, the formed wetted fiber material comprising the fiber material and the resin;
   further processing the formed wetted fiber material into strips or roles to form at least one layer of wetted fiber material;
   providing a first blade component being constructed of a first composite material;
   providing a second blade component being constructed of a second composite material;
   arranging the first and second blade components adjacent to each other;
   placing the at least one layer of processed, wetted fiber material in a wetted state between the first and second blade components at an interface therebetween; and
   curing the at least one layer of the processed, wetted fiber material at the interface.

2. The method of claim 1, wherein placing the at least one layer of the processed, wetted fiber material at the interface further comprises unrolling the wetted fiber material at the interface.

3. The method of claim 1, further comprising layering the processed wetted fiber material at the interface.

4. The method of claim 1, wherein the fiber material comprises at least one of glass fibers, carbon fibers, metal fibers, polymer fibers, ceramic fibers, nanofibers, or combinations thereof.

5. The method of claim 1, wherein the first and second composite materials comprise prefabricated composite materials, the prefabricated composite materials comprising one or more cured resin materials reinforced with at least one fiber material.

6. The method of claim 1, wherein the first blade component comprises a shear web of the rotor blade and the second blade component comprises a spar cap of the rotor blade.

7. The method of claim 1, wherein the first blade component comprises a spar cap of the rotor blade and the second blade component comprises a blade shell of the rotor blade.

8. The method of claim 1, wherein the first blade component comprises a pressure side of the rotor blade and the second blade component comprises a suction side of the rotor blade.

9. A method for bonding a shear web between opposing spar caps of a rotor blade of a wind turbine, the shear web having a first end and a second end, the method comprising:
   providing a resin bath that contains a resin that includes one of a thermoset or thermoplastic material;
   forming a wetted fiber material by drawing a fiber material through the resin bath, the formed wetted fiber material comprising the fiber material and the resin;
   further processing the formed wetted fiber material into strips or roles to form at least one layer of wetted fiber material;
   arranging the shear web between the opposing spar caps, wherein the first end of the shear web contacts an upper spar cap at a first interface and the second end of the shear web contacts a lower spar cap at a second interface;
   placing the at least one layer of processed, wetted fiber material in a wetted state at the first and second interfaces; and
   curing the at least one layer of the processed, wetted fiber material at the first and second interfaces.

10. The method of claim 9, wherein placing the processed wetted fiber material at the first and second interfaces further comprises unrolling the wetted fiber material at the first and second interfaces.

11. The method of claim 9, further comprising layering the fiber material at the first and second interfaces.

* * * * *